(12) United States Patent
Solanki et al.

(10) Patent No.: US 7,860,734 B2
(45) Date of Patent: Dec. 28, 2010

(54) SYSTEMS AND METHODS FOR QUOTING REINSURANCE

(75) Inventors: Dhar Solanki, London (GB); Gary Collier, Kent (GB); Martin Langkjaer-Ohlenschlaeger, Munich (DE)

(73) Assignee: Employers Reinsurance Corporation, Overland Park, KS (US)

( * ) Notice: Subject to any disclaimer, the term of this patent is extended or adjusted under 35 U.S.C. 154(b) by 1190 days.

(21) Appl. No.: 10/677,930

(22) Filed: Oct. 2, 2003

(65) Prior Publication Data

US 2005/0075910 A1  Apr. 7, 2005

(51) Int. Cl.
G06Q 40/00  (2006.01)

(52) U.S. Cl. .......................................... 705/4

(58) Field of Classification Search ............... 705/2–3
See application file for complete search history.

(56) References Cited

U.S. PATENT DOCUMENTS

| | | | | |
|---|---|---|---|---|
| 5,806,042 A | * | 9/1998 | Kelly et al. | 705/4 |
| 5,873,066 A | | 2/1999 | Underwood et al. | |
| 5,970,464 A | * | 10/1999 | Apte et al. | 705/4 |
| 6,049,773 A | | 4/2000 | McCormack et al. | |
| 6,321,212 B1 | | 11/2001 | Lange | |
| 2002/0082875 A1 | * | 6/2002 | Best-Devereux | 705/4 |
| 2002/0116210 A1 | * | 8/2002 | Medina et al. | 705/1 |
| 2002/0156656 A1 | * | 10/2002 | Harrell et al. | 705/4 |
| 2002/0198743 A1 | * | 12/2002 | Ariathurai et al. | 705/4 |
| 2003/0018497 A1 | * | 1/2003 | Luedtke | 705/4 |
| 2003/0083908 A1 | * | 5/2003 | Steinmann | 705/4 |

OTHER PUBLICATIONS www.reinsure.com, 2002.*
Reinsurance traders offered online platform. Caroline McDonald. National Underwriter. Property & Casualty/Risk & Benefits Management. Erlanger; Feb. 12, 2001. vol. 105, Iss 7; p. 2.*
Common Ground. Ron Panko. Best's Review. Oldwick: Jan. 2003. vol. 103, Iss. 9; p. 73.*
Customer made re platforms. Lisa S. Howard. National Underwriter. Property & Casualty/Risk & Benefits Management. Erlanger: Jan. 27, 2003. vol. 107, Iss 4; p. 16.*

* cited by examiner

Primary Examiner—Luke Gilligan
Assistant Examiner—Kristine K Rapillo
(74) Attorney, Agent, or Firm—Armstrong Teasdale LLP

(57) ABSTRACT

A system and method is provided for quoting reinsurance. A web server receives electronic requests for reinsurance quotations and authenticates users generating the requests. An application server connects with the web server to formulate the quotation based upon the requests. A database connects with the application server and stores the quotation and other data (e.g., actuarial tables) used to generate the quotation. The electronic requests may include a selection of a preexisting quote within the database. A profitability analysis engine may analyze profits of the quotation, so that the customer users further receive profitability information associated with the quotation.

36 Claims, 16 Drawing Sheets

FIG. 9

View Results - Income Protection Insurance (IPI)

| Project Name | IPI project | | Project Owner | pricing |
| --- | --- | --- | --- | --- |
| Deferred period | 13 weeks | | Escalation Rate | Esc Level |
| Ages | 20-40 | | Terms | Term 1-5 |

Male Class 1 : Annual Premium rates per $100 of benefit

| Age x | Term 1 | Term 2 | Term 3 | Term 4 | Term 5 |
| --- | --- | --- | --- | --- | --- |
| 20 | 0.0 | 0.0 | 0.0 | 0.0 | 0.0 |
| 21 | 0.0 | 0.0 | 0.0 | 0.0 | 0.0 |
| 22 | 0.0 | 0.0 | 0.0 | 0.0 | 0.0 |
| 23 | 0.0 | 0.0 | 0.0 | 0.0 | 0.0 |
| 24 | 0.0 | 0.0 | 0.0 | 0.0 | 0.0 |
| 25 | 0.0 | 0.0 | 0.0 | 0.0 | 0.0 |
| 26 | 0.0 | 0.0 | 0.0 | 0.0 | 0.0 |
| 27 | 0.0 | 0.0 | 0.0 | 0.0 | 0.0 |
| 28 | 0.0 | 0.0 | 0.0 | 0.0 | 0.0 |
| 29 | 0.0 | 0.0 | 0.0 | 0.0 | 0.0 |
| 30 | 0.0 | 0.0 | 0.0 | 0.0 | 0.0 |
| 31 | 0.0 | 0.0 | 0.0 | 0.0 | 0.0 |
| 32 | 0.0 | 0.0 | 0.0 | 0.0 | 0.0 |
| 33 | 0.0 | 0.0 | 0.0 | 0.0 | 0.0 |
| 34 | 0.0 | 0.0 | 0.0 | 0.0 | 0.0 |
| 35 | 0.0 | 0.0 | 0.0 | 0.0 | 0.0 |
| 36 | 0.0 | 0.0 | 0.0 | 0.0 | 0.0 |
| 37 | 0.0 | 0.0 | 0.0 | 0.0 | 0.0 |
| 38 | 0.0 | 0.0 | 0.0 | 0.0 | 0.0 |
| 39 | 0.0 | 0.0 | 0.0 | 0.0 | 0.0 |
| 40 | 0.0 | 0.0 | 0.0 | 0.0 | 0.0 |

Prepared for: company1

[Download Results] [Print] [Notes] [Close]

FIG. 10

View Results - Lump Sum

Life Cover Risk Premium Rates

| Project Name | testingfinal | Project Owner | pricing |
| Sex | Male | Smoker Status | Non-Smoker |

| Age x | Ultimate | Age x+0 |
|---|---|---|
|  | 0.000 | 0 |
|  | 0.000 | 1 |
|  | 0.000 | 2 |
|  | 0.000 | 3 |
|  | 0.000 | 4 |
|  | 0.000 | 5 |
|  | 0.000 | 6 |
|  | 0.000 | 7 |
|  | 0.000 | 8 |
|  | 0.000 | 9 |
|  | 0.000 | 10 |
|  | 0.000 | 11 |
|  | 0.000 | 12 |
|  | 0.000 | 13 |
| 15 | 0.000 | 14 |
| 16 | 0.000 | 15 |
| 17 | 0.000 | 16 |
| 18 | 0.000 | 17 |
| 19 | 0.000 | 18 |
| 20 | 0.000 | 19 |
| 21 | 0.000 | 20 |
| 22 | 0.000 | 21 |
| 23 | 0.000 | 22 |
| 24 | 0.000 | 23 |
| 25 | 0.000 | 24 |
| 26 | 0.000 | 25 |
| 27 | 0.000 | 26 |
| 28 | 0.000 | 27 |
| 29 | 0.000 | 28 |
| 30 | 0.000 | 29 |
| 31 | 0.000 | 30 |
| 32 | 0.000 | 31 |
| 33 | 0.000 | 32 |
| 34 | 0.000 | 33 |
| 35 | 0.000 | 34 |
| 36 | 0.000 | 35 |
| 37 | 0.000 | 36 |
| 38 | 0.000 | 37 |
| 39 | 0.000 | 38 |
| 40 | 0.000 | 39 |
| 41 | 0.000 | 40 |
| 42 | 0.000 | 41 |
| 43 | 0.000 | 42 |
| 44 | 0.000 | 43 |
| 45 | 0.000 | 44 |
| 46 | 0.000 | 45 |
| 47 | 0.000 | 46 |
| 48 | 0.000 | 47 |
| 49 | 0.000 | 48 |
| 50 | 0.000 | 49 |
| 51 | 0.000 | 50 |
| 52 | 0.000 | 51 |
| 53 | 0.000 | 52 |
| 54 | 0.000 | 53 |
| 55 | 0.000 | 54 |
| 56 | 0.000 | 55 |
| 57 | 0.000 | 56 |
| 58 | 0.000 | 57 |
| 59 | 0.000 | 58 |
| 60 | 0.000 | 59 |
| 61 | 0.000 | 60 |
| 62 | 0.000 | 61 |
| 63 | 0.000 | 62 |
| 64 | 0.000 | 63 |
| 65 | 0.000 | 64 |
| 66 | 0.000 | 65 |
| 67 | 0.000 | 66 |
| 68 | 0.000 | 67 |
| 69 | 0.000 | 68 |
| 70 | 0.000 | 69 |
| 71 | 0.000 | 70 |
| 72 | 0.000 | 71 |
| 73 | 0.000 | 72 |
| 74 | 0.000 | 73 |
| 75 | 0.000 | 74 |

FIG. 11

*Quote Editor - Lump Sum*

| | | | |
|---|---|---|---|
| Company | Your Company Name | Project Name | Project 1 |
| Quote Owner | NickCAL5 | Territory | UK |
| | | Quote Status | Active |
| Date Created | 12-Jul-2001 | Date Modified | 12-Jul-2001 |

Quote Name

Cover Details

| | | | |
|---|---|---|---|
| Type of Product | LTA | Mortgage Link | ☐ |
| Life Cover | ☑ | TPD Cover | ☐ |
| CI Cover | ☐ | TI Cover | ☐ |
| Childrens Cover | ☐ | | |
| TPD - 1st Definition | N/A | TPD Changes at Age | 15 |
| TPD - 2nd Definition | N/A | Survival Period | N/A |
| Sex | Male & Female | Smoker Status | Non-smoker & Smoker |
| Min. Age at Entry | 15 | Max. Age at Entry | 75 |
| Select Period | Select | Expiry Age of Contract | 85 |
| Step Age | 1 | | |
| Guaranteed / Reviewable | Reviewable | Term of Guarantee | 0 |

Additional Comments

```
Quote Editor
File  Edit  View  Favorites  Tools  Help
Back  Forward  Stop  Refresh  Home  Search  Favorites  History  Mail  Print  Links
Address: http://pc-p20284/NASApp/ePricing/login.jsp                                    Go
```

Quote Code            QILSO              Quote Name     Quote 1
Date Created          12-Jul-2001        Date Modified  12-Jul-2001
Quote Status          Active Critical Illnesses
⦿ Core 3       ○ Core 7

| | | | | | |
|---|---|---|---|---|---|
| Cancer | ☑ | Heart Attack | ☑ | Stroke | ☑ |
| CABG | ☐ | Kidney Failure | ☐ | Major Organ Transplant | ☐ |
| Multiple Sclerosis | ☐ | | | | |

Select All | Deselect All

Surgeries & Heart Related (Enter Percentage Benefit on Surgey Eg. enter 100 for 100%

| | | | | | |
|---|---|---|---|---|---|
| Aorta Graft Surgery | 0.0 | Heart Valve Surgery | 0.0 | Heart Valve Replacement only | 0.0 |
| Angioplasty 1 vessel | 0.0 | Angioplasty 2+ vessels | 0.0 | Open Heart Surgery | 0.0 |
| Pulmonary Artery Surgery | 0.0 | Cardiomiopathy | ☐ | | |

Disablement / Accident

| | | | | | |
|---|---|---|---|---|---|
| Loss of Hearing | ☐ | Loss of Sight | ☐ | Loss of Speech | ☐ |
| Loss of 1 limb (wrist/ankle) | ☐ | Loss of 1 limb (elbow/knee) | ☐ | Loss of 2+ limbs (wrist/ankle) | ☐ |
| Loss of 2+ limbs (elbow/knee) | ☐ | Paralysis / Paraplegia | ☐ | Third degree burns | ☐ |
| Coma | ☐ | Major Head Trauma | ☐ | | |

Diseases

| | | | | | |
|---|---|---|---|---|---|
| Benign Brain Tumor | ☐ | Hodgkins Disease | ☐ | Chronic Emphysema | ☐ |
| AIDS - Needlestick | ☐ | AIDS - Physical Assault | ☐ | AIDS - Blood Transfusion | ☐ |
| Bacterial Meningitis | ☐ | CJD | ☐ | Muscular Dystrophy | ☐ |

Diseases With Age Cap For Cover

| | | | |
|---|---|---|---|
| Parkinson's Disease | ☐ | Before Age | 65 |
| Motor Nurone Disease | ☐ | Before Age | 65 |
| Alzheimer's Disease | ☐ | Before Age | 65 |
| Dimetia | ☐ | Before Age | 65 |
| Rheumatoid Arthritis | ☐ | Before Age | 65 |

Local intranet

| Quote Editor |
| File Edit View Favorites Tools Help |

Address: http://pc-p20284/NASApp/ePricing/login.jsp

| Company | Your Company Name | Territory | UK |
| Project Name | Project IPI 1 | Quote Owner | NickCAL 5 |
| | | Quote Status | Active |
| Date Created | 12-Jul-2001 | Date Modified | 12-Jul-2001 |

Quote Name: [ ]
Mortgage Link: ☐
Occupation Definition: [Own Occupation ▼]

Type of Product: [Full IPI ▼]
Expected Premium Income: [0.00]

*Mortgage Link:*

Mortgage Interest: [Fixed ▼]     Critical Illness Overlap: [No Overlap ▼]
ASU Overlap: ☐

*Deferred Periods:*

| 4 weeks | ☐ | 8 weeks | ☐ | 13 weeks | | ☐ |
| 26 weeks | ☐ | 52 weeks | ☐ | 104 weeks | | ☐ |

Minimum Age at Entry [20]    Maximum Age at Entry [64]    Step Age [1]

*Retirement Ages:*

| Age 50 | ☐ | Age 55 | ☐ | Age 60 | ☑ | Age 65 | ☐ |

*Limited Term:*

| 1 Year | ☐ | 2 Years | ☐ | 3 Years | ☐ | 4 Years | ☐ | 5 Years | ☐ |

*Guaranteed Reassurance Rates:*

Guaranteed / Reviewable [Reviewable ▼]    Term of Guarantee [0]

*Escalations (contact Actuarial Rep for other escalation rates):*

| Level | ☐ | 3% | ☐ | 5% | ☐ | RPI | ☐ | NAE | ☐ |

Local intranet

| | | | | | |
|---|---|---|---|---|---|
| Home | | | | | Logoff |

*You are logged in as : sadmin1*

Business Mix

| | | | | |
|---|---|---|---|---|
| Company | b company | | Project Name | Project_IPI |
| Type of Business | Individual | | Key Client Status | Key |
| Quote Owner | sadmin1 | | Territory | UK |
| Quote Name | Notes_NPPP_Test | | Quote Code | QTIPI1979 |
| Quote Status | Signed Off | | Tyoe of Reinsurance | Original Terms |
| Date Created | 15-May-2002 | | Date Modified | 03-Jun-2002 |
| Type of Product | Full IPI | | | |

*\* Values will be rounded to 2 decimal places*

| Age | Term 50 | 55 | 60 | 65 |
|---|---|---|---|---|
| 20 | 0.00 | 0.00 | 0.00 | 0.00 |
| 25 | 0.00 | 0.00 | 0.00 | 0.00 |
| 30 | 0.00 | 0.00 | 0.00 | 0.00 |
| 35 | 0.00 | 0.00 | 0.00 | 0.00 |
| 40 | 0.00 | 0.00 | 0.00 | 0.00 |
| 45 | 0.00 | 0.00 | 0.00 | 0.00 |
| 50 | | 0.00 | 0.00 | 0.00 |
| 55 | | | 0.00 | 0.00 |
| 60 | | | | 0.00 |

[Save]  [Upload]  [Close]

[Apply Basis Defaults]  [Apply Quote Defaults]

FIG. 16

Summary Results

| | | | |
|---|---|---|---|
| Company | EBoardCompany | Project Name | LumpSumProject |
| Type of Business | Individual | Key Client Status | Key |
| Quote Owner | sadmin1 | Territory | UK |
| Quote Name | LavinaOT | Quote Code | QTLS1354 |
| Quote Status | Active | Tyoe of Reinsurance | Original Terms |
| Type of Rebate | Original Terms Nil premium paying period | Profit Test Model | CGLS01 |
| Type of Product | Increasing Term Insurance | Type of Cover | Lump Sum |
| Date Created | 26-Mar-2002 | Date Modified | 27-Mar-2002 |
| Run Date | 27-Mar-2002 | | |

Number of Months of Nil Premium Payment Period

| Average Rebate | | Smoker Status | Sex |
|---|---|---|---|
| | | Smoker | Non-Smoker |
| Sum Assured | Increase Rate | Male | Male |
| 1-1000 | RPI | -112.7 | 40.6 |
| | 3.0% | -114.5 | 41.6 |
| | 6.5% | -128.3 | 49.8 |
| 1000-2000 | RPI | -112.7 | 40.6 |
| | 3.0% | -114.5 | 41.6 |
| | 6.5% | -128.3 | 49.8 |
| 2001-10000000 | RPI | -112.7 | 40.6 |
| | 3.0% | -114.5 | 41.6 |
| | 6.5% | -128.3 | 49.8 |

Collapse Weights

| | |
|---|---|
| Sex | None |
| Smoker Status | None |
| Increase | None |
| Sum assured | None |

[Save View for Signoff]  [Collapse]  [Close]

SYSTEMS AND METHODS FOR QUOTING REINSURANCE

BACKGROUND

Typically, an insurance company issues an insurance policy (e.g., a life term policy) covering a person and then passes on some of the risk to a reinsurance company, to help smooth profits in the event of adverse claims experience. The process of risk transfer involves relaying information between the insurance company and the reinsurance company, and then negotiating and executing a contract covering the terms of reinsurance. This process can take thirty days or more, and involves a number of persons depending upon the size and complexity of the reinsurance contract. In one example, the insurance company sends an email to the reinsurance company setting forth basic terms of the insurance policy, and requests a reinsurance "factoring" of price for stated percentages of reinsurance liability. Such a process is time-consuming and costly to both the insurance company and reinsurance company.

SUMMARY OF THE INVENTION

Certain of the following systems and methods seek to advance the state of the art in reinsurance processes and software systems by automating reinsurance quotations and/or policy negotiations. Other features are apparent within the description that follows.

In one aspect, a system enables digital transactions for reinsurance quotation and/or contract execution. The users of the system may include external users of insurance companies (hereinafter "customers"), and internal users of the reinsurance company. In one example, the customers use the system to generate risk premium quotations with minimal user input through a web interface; the customers enter data to the web interface and the system automatically generates a quotation in return. In another example, the internal users track which insurance companies are generating quotes, to facilitate improved interaction between such insurance companies and the reinsurance company.

In one aspect, the system automatically generates and transmits email in connection with a customer seeking and/or obtaining a quote. Such email may be sent to the customer and/or to the internal users. In one example, the email is sent to internal users within pricing and sales departments of the reinsurance company and associated with a specific customer seeking quotes. The email serves to facilitate improved coordination between the specific customer and the reinsurance company.

In another aspect, a customer may modify a quotation without reentering previously entered data. Accordingly, a customer can change attributes of a prior quote and rerun a quotation through the system without manually reentering all data.

In yet another aspect, the system provides a plurality of security levels specific to users of the system. In one example, the system has six levels of security: super internal users, pricing internal users, sales internal users, ordinary internal users, key customer users, and basic customer users. These security levels limit access to certain information within the system depending upon who the user is. The super internal users are typically actuaries of the reinsurance company, and have top-level access to all information and security settings associated with a particular customer and/or a particular customer's interaction with the system. The pricing internal users may include internal users in the pricing department of the reinsurance company who are associated with the particular customer, but who do not have access to the security settings. In one example, super internal users and pricing internal users control rate tables that dictate calculations used by the system in generating quotes. The sales internal users may include sales executives in the sales department of the reinsurance company who sell insurance products to customers; the sales internal users are for example restricted from modifying pricing data for insurance quotations. The ordinary internal users typically have a lowest level security access within the reinsurance company; the ordinary user may for example be a staff member of the reinsurance company who has viewing privileges but not editing privileges. The key customer user is typically an external user and manager for an insurance company; the key customer user has for example top-level access to all information and security settings associated with an insurance company, except that the key customer user cannot modify reinsurance pricing information (e.g., rate tables) or access information relating to any other insurance company. The basic customer user is typically an external user within the pricing department of the insurance company, who has minimal access to view and modify information associated with his insurance company. The plurality of security levels facilitates control of information among various levels within both the reinsurance company and the customer. A key customer user may for example have a security level commensurate with a sales internal user, except the latter may see additional information relevant to other insurance companies and specific to the reinsurance company.

In one example, when a customer interacts with the system to obtain a quote, internal users in the top three levels of security (i.e., super internal users, pricing internal users, sales internal users) receive email about the customer's interaction; the email may for example include information about the basic quote, the variables used in the quote, and/or hyperlinks to the customer. In one aspect, the system also generates generic email to the sales and/or pricing departments of the reinsurance company in case internal users associated with the customer are absent at the time of the customer's quote; in this way, other internal users may act on the generic email if warranted and desired.

To manage email delivery, the system of one aspect sends a batch email once per day to appropriate internal users so that these users are not inundated with email notifications of every customer quote obtained through the system. In another aspect, email is nonetheless automatically generated and sent in near real-time to appropriate internal users if the customer indicates a desire to execute a reinsurance contract based on the quote. These aspects further facilitate improved interaction between the insurance company and the reinsurance company.

In one aspect, quotes are generated by the system to a requesting customer within a selected time period set by internal users. For example, one time period is forty-eight hours. The system may nonetheless issue an email notification to the customer that the system received the quote request from the customer and that the reinsurance company will issue the quote within the time-period.

In one aspect, the system generates quotes in a form downloadable to a software spreadsheet, such as EXCEL®, so that users may further process data of the quotes. In another aspect, internal users append notes to quotations by editing word processing software, such as WORD®, and then submitting edited electronic documents to the system.

In another aspect, the system ensures that certain departments (e.g., pricing and sales) within the reinsurance company view and approve all quotes prior to acceptance and execution of a reinsurance contract. In one example, the system forwards email to appropriate persons within pricing and sales departments; the email sets forth terms of the proposed reinsurance contract, whereinafter the system accepts return email from internal users of the pricing and sales department to forward an executed contract to the insurance company seeking reinsurance.

Certain features of the system may thus provide certain advantages, for example, in providing a secure central repository that responds to internal and external users to generate near real-time life and health reinsurance quotations. Users may for example generate quotations, copy quotations, create differing business mixes for certain quotations, and/or modify the underlying tables from which quotations are based.

In one aspect, the architecture of the system is a three-tier architecture that includes a web server, an application server, and a database server. The web server receives requests from a web browser and forwards the requests to the application server. The web server also controls log-in and authentication procedures. The application server contains the business logic that enables the calculation of quotations and that handles requests for inserting, deleting and updating records in the database server. The database server contains tables for storing data about the insurance company, users (internal and external), project codes, quotes and the insureds. Results, rules, constraints and relationships between the tables may define the logical structure of the database server.

In still another aspect, an interface architecture provides an interface between the system and actuarial modeling software that performs profitability analysis and decision making routines based upon specific quotations. In one aspect, the interface architecture utilizes TIBCO™ connectivity tools, by TIBCO Software, Inc., and the profitability software includes PROPHET™, by B&W Deloitte.

In another aspect, the system responds to requests by internal users to summarize activity per customer and/or per business area, typically over a period of time. In this way, the reinsurance company can track trends of customers and business usage.

BRIEF DESCRIPTION OF THE DRAWINGS

FIG. 9 shows one exemplary view results screen for communicating a reinsurance quotation to a user through the system of FIG. 2;

FIG. 10 shows another exemplary view results screen for communicating a reinsurance quotation to a user through the system of FIG. 2;

FIG. 11 shows one exemplary quote edit screen for editing reinsurance quotations through the system of FIG. 2;

FIG. 12 shows one exemplary critical illness screen for inputting critical illnesses to the system of FIG. 2;

FIG. 13 shows another exemplary quote edit screen for editing reinsurance quotations through the system of FIG. 2;

FIG. 14 shows one exemplary business mix screen for inputting business mix information to the system and profitability engine of FIG. 2;

FIG. 15 shows another exemplary business mix screen for inputting business mix information to the system and profitability engine of FIG. 2; and FIG. 16 shows one exemplary quote results screen for showing reinsurance quotation with profitability numbers.

DETAILED DESCRIPTION OF THE DRAWINGS

Figure 1:
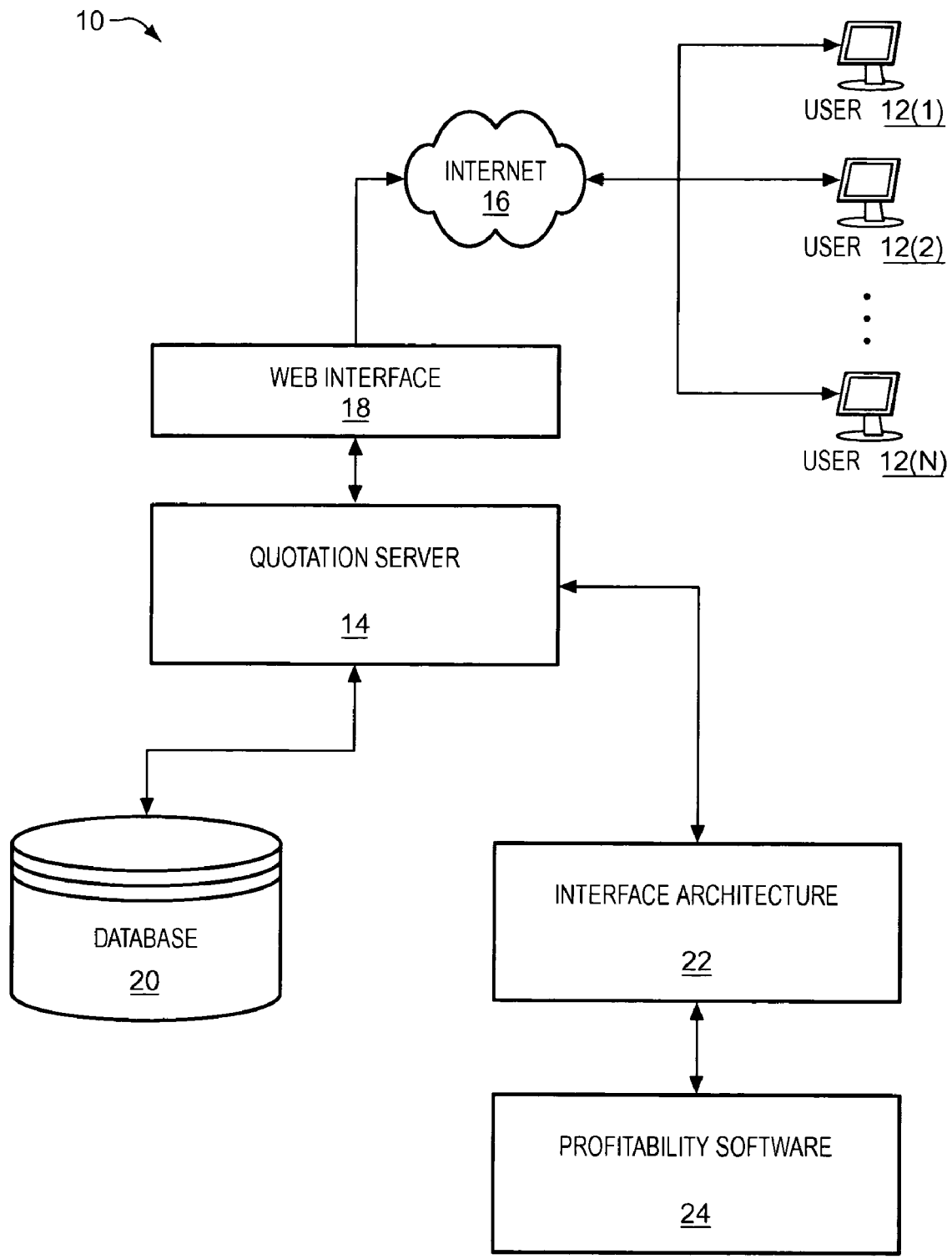
FIG. 1 shows a schematic block diagram of one system for quoting reinsurance.

FIG. 1 shows one system 10 for quoting reinsurance to one or more users 12. Via web browser software, users 12 access a quotation server 14 through the Internet 16 and a web interface 18. Web interface 18 provides access security to quotation server 14 so that only authorized users 12 utilize quotation server 14. With appropriate access, quotation server 14 provides reinsurance quotations to users 12 in response to user requests; these requests include input data to an insurance policy for which reinsurance is sought.

Users 12 are shown illustratively as a plurality (N) of users 12(1), 12(2) ... 12(N) and may include both internal users of a reinsurance company and external users of one or more insurance companies utilizing system 10. In one operational example of system 10, user 12(1) is a user of insurance company ABC and user 12(2) is an internal user managing the account of insurance company ABC. User 12(1) has access privileges to use quotation server 14. In this example, insurance company ABC desires reinsurance for a life insurance policy of a particular individual client of insurance company ABC. User 12(1) thus downloads data regarding the individual client to quotation server 14, and quotation server 14 processes and generates a reinsurance quote to user 12(1). The reinsurance quote may be sent to user 12(1) as email, within email, and/or publish as a web page viewable by user 12(1). In one embodiment, quotation server 14 also sends an email to user 12(2), notifying user 12(2) that insurance company ABC has obtained the reinsurance quote, so that user 12(2) may assist user 12(1) and/or monitor needs of insurance company ABC.

System 10 stores data including quotes, pricing, actuarial tables and other information (e.g., tax and interest rates) in a database 20 connected to quotation server 14.

Quotes generated by quotation server 14 may be reprocessed by a user 12 without reentering all data if certain data is repetitive. Accordingly, a user 12 may recall a prior quote (e.g., stored within database 20), modify changed attributes and request a new quotation. Quotation server 14 then publishes the new quote for the requesting user 12.

Figure 2:
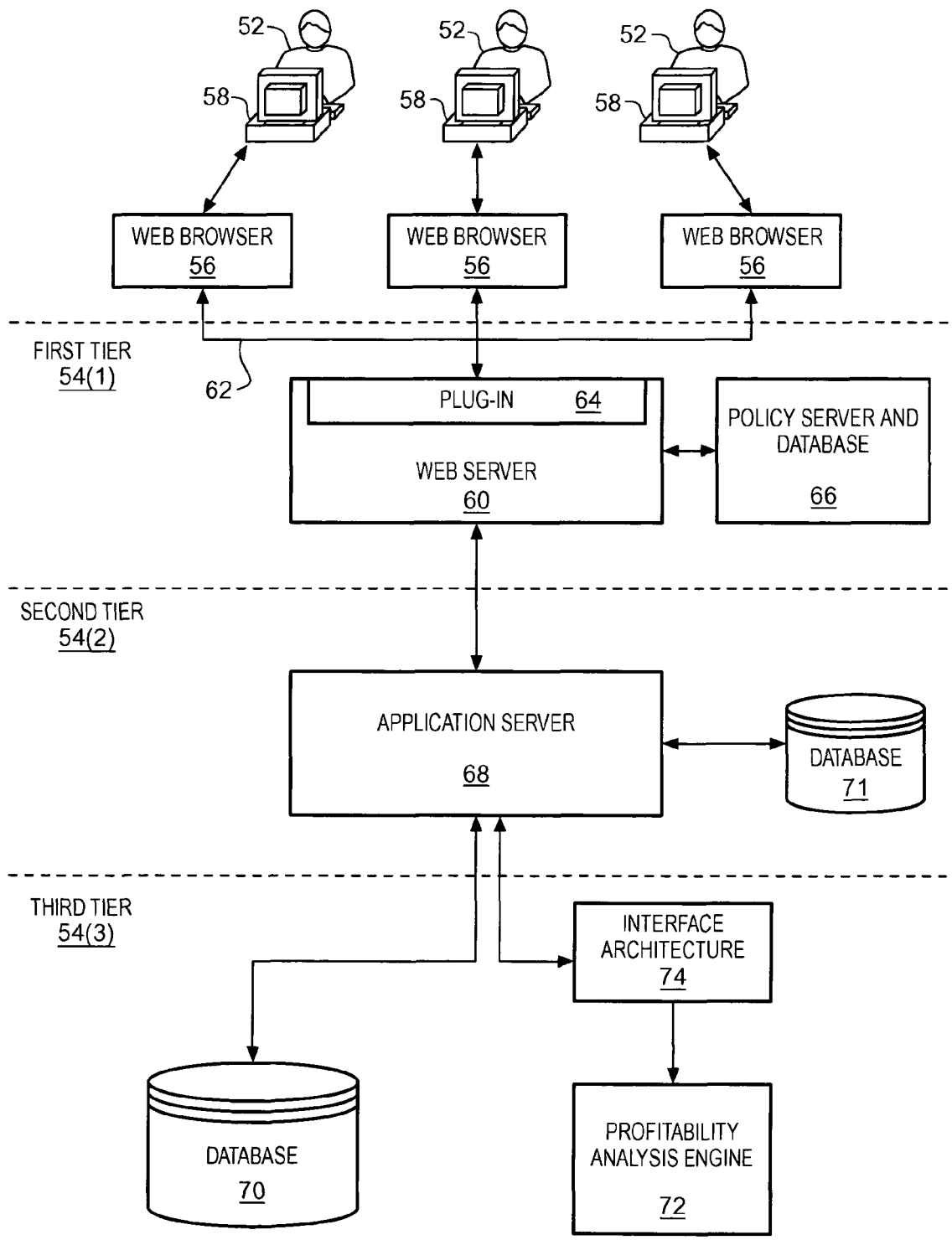
FIG. 2 shows another schematic diagram illustrating one system for quoting reinsurance.

FIG. 2 shows one system 50 for quoting reinsurance to one or more users 52. System 50 is illustratively segregated into three tiers 54(1), 54(2), 54(3), as shown; users 52 access system 50 through first tier 54(1) utilizing web browser software 56 (e.g., Internet Explorer 4.0) loaded with respective computers 58. A web server 60 (e.g., an iPlanet Web Server 4.1) forms first tier 54(1). Web server 60 interfaces with web browsers 56 via a secured transmissions 62 (e.g., HTTPS or SSL); users 52 communicate requests (including authorization data) and data to system 50 as secured transmissions 62, and system 50 communicates reinsurance quotations and/or profitability assessments to users 52 as secured transmissions

62. A plug-in 64 (e.g., a SiteMinder webagent plug-in from Sun Microsystems, Inc.) manages user requests 62 and compares user authorization data with data stored in a policy server and database 66 (e.g., a SiteMinder Policy Server and Lightweight Directory Access Protocol (LDAP) database). Providing the requesting user 52 has correct authorizations, web server 60 communicates the user's request to an application server 68, which forms tier two 54(2).

The development environment of application server 68 is for example Java, utilizing Java Server Pages (JSP 1.1), Enterprise Java Beans (EJB 1.0), Java Servlets 2.2, and JavaMail 1.1. Application server 68 uses this development environment to process user requests. For example, Java servlets receive HTTBS requests from a user 52 and dispatch the HTTPS requests to the EJBs. The EJBs contain business logic to calculate quotes and to handle requests for inserting, deleting and updating records in a database 70, which forms tier three 54(3) of system 50. The JSPs provide display logic to produce HTML pages for users 52. Application server 68 may interact with a database 71 (e.g., another LDAP database utilizing an iPlanet application server) to read configuration information and to lookup resources such as EJBs.

Database 70 is for example an Oracle 8.1.6 relational database. Database 70 contains tables storing company, user, project, quote and basis data; it also holds the results (e.g., quotes) of the calculation process. Rules, constraints and relationships between the tables may define the logical layout of database 70.

Application server 68 may optionally interface with profitability analysis engine 72, e.g., a server with profitability software (e.g., profitability software 24, FIG. 1), to generate profitability numbers associated with reinsurance quotations of system 50. As described in connection with FIG. 3, an interface architecture 74 (e.g., interface architecture 22, FIG. 1) may translate data to and between profitability analysis engine 72, utilizing PROPHET™ profitability software, and application server 68 through a messaging protocol utilizing TIBCO connectively tools.

Figure 3:
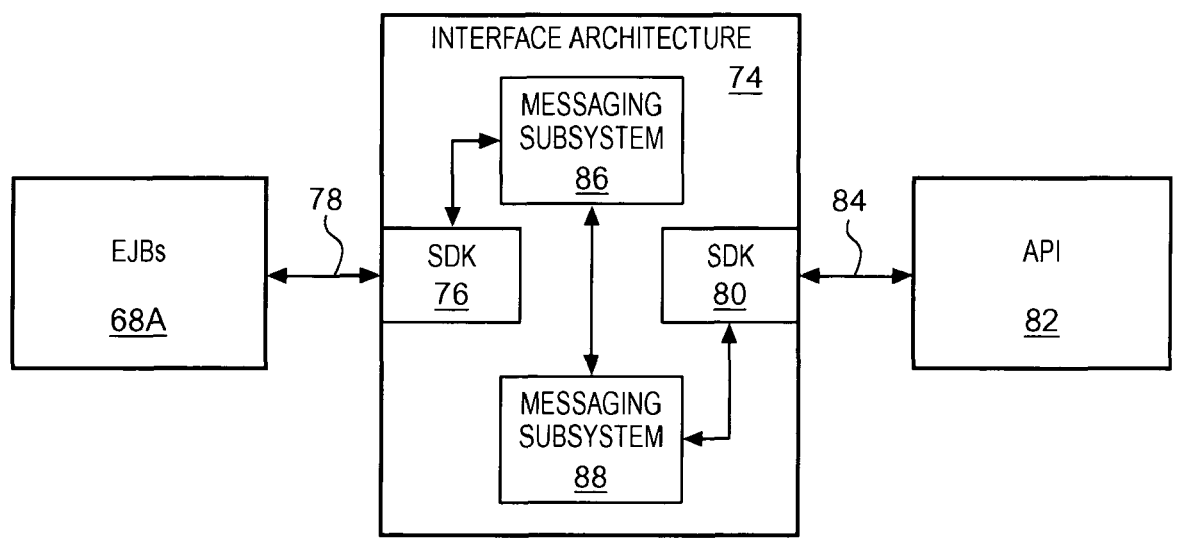
FIG. 3 shows one optional interface architecture for interfacing between the system of FIG. 2 and profitability software.

FIG. 3 shows further detail of interface architecture 74. Through a first TIBCO Adapter SDK™ 76, architecture 74 communicates to and from EJBs 68A of application server 68, as illustrated by communication path 78. Through a second TIBCO Adapter SDK 80, architecture 74 communicates to and from an application programmer interface (API) 82 of PROPHET, as illustrated by communication path 84. Two messaging subsystems 86, 88 (e.g., in the form of TIBCO Rendezvous™) provide messaging between SDKs 76, 80, respectively; this messaging provides for effective communications between the platforms of application server 68 and profitability analysis engine 72.

Figure 4:
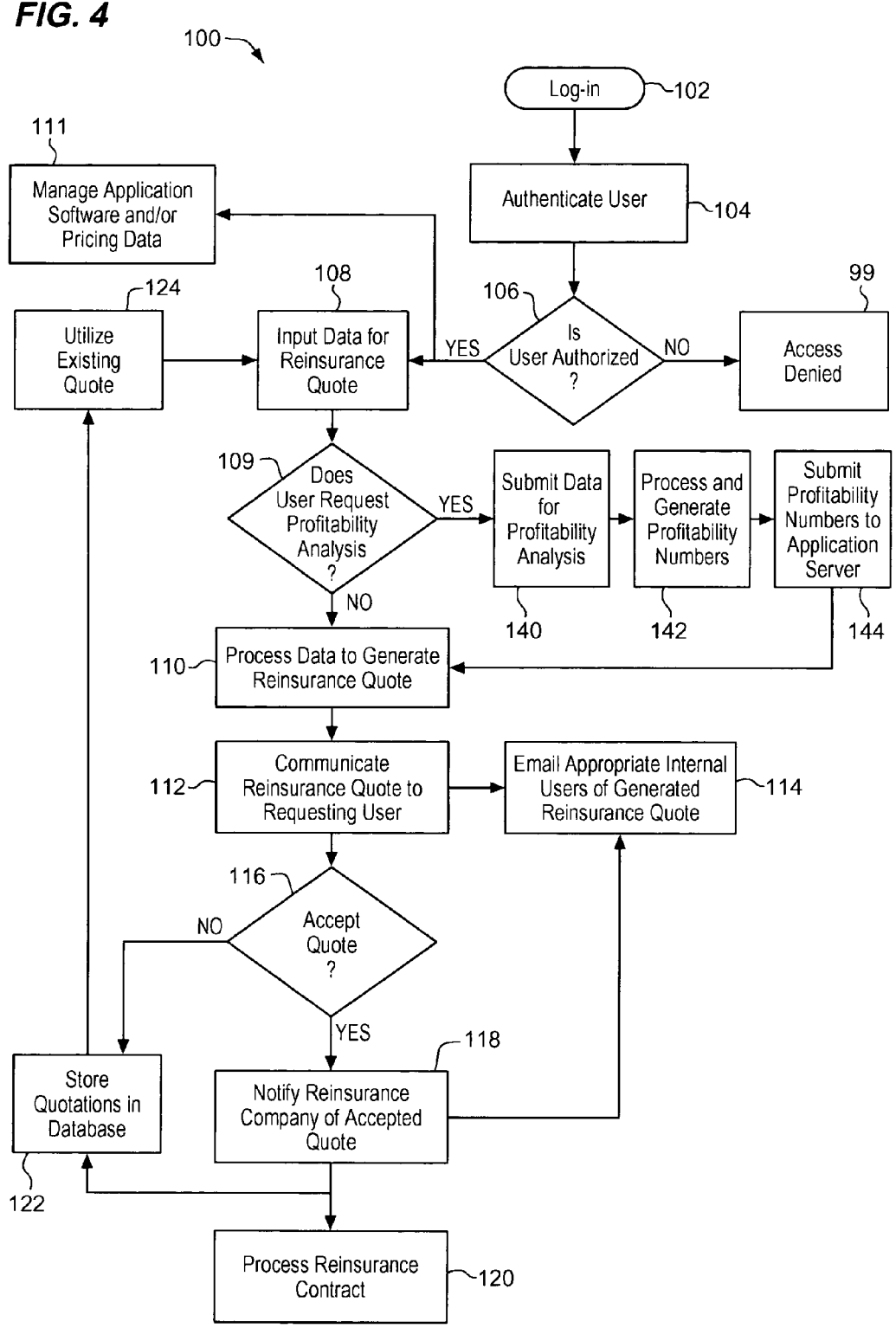
FIG. 4 is a flow chart illustrating one process for quoting reinsurance through the system of FIG. 2.

FIG. 4 shows a flowchart illustrating one process 100 for generating reinsurance quotations through system 50, FIG. 2. Process 100 begins with a log-in 102 by user 52 to system 50. Log-in 102 utilizes web browser 56 to submit user authorization data identifying user 52 to web server 60. Web server 60 authenticates user 52 in step 104 by comparing the authentication data with data stored in policy server and database 66. At decision 106, if the user is authorized, process 100 continues to step 108; if the user is not authorized, access to system 50 is denied to user 52, in step 99. As described in more detail below, if the authenticated user is an authorized internal user, the internal user may also access and modify actuarial pricing assumptions used by system 50 in quoting reinsurance, as illustrated by step 111.

In step 108, the authorized user inputs data regarding insurance policy for which the user's company desires reinsurance. If 109 the user desires a profitability analysis in addition to the reinsurance quotation, process 100 continues with step 140. If 109 the user does not desire a profitability analysis, application server 68 processes the data and generates the quote for reinsurance, in step 110. The quotation of step 110 is communicated to the requesting user in step 112; step 112 may include generating an HTML page which user 52 can view via browser 56. Internal users of the reinsurance company are notified by email of the generated quote, in step 114; step 114 may occur in a batch mode at the end of each day for every quote generated 110 by system 50 during that day.

If 116 the user decides that the quote is acceptable, he may accept the quoted terms by notifying 118 system 50; the step of notifying 118 may for example include processing the HTML page via browser 56. System 50 immediately sends email 114 to the appropriate internal user so that the reinsurance company may process an appropriate reinsurance contract, in step 120. Step 120 may include automatically generating and communicating the reinsurance contract to the user subject to review by an appropriate internal user, e.g., a super internal, or sales internal user.

Quotations are stored in database 70 in step 122. These quotations may be utilized in conjunction with step 108 to input data regarding the insurance policy, if the user already processed a similar quote, as illustrated by step 124.

If 109 a user desires a profitability analysis, system 50 submits 140 data to profitability analysis engine 72. Step 140 may include converting data through messaging subsystems 86, 88 (FIG. 3) of interface architecture 74. Data input at step 140 may include business mix information associated with the client and input to system 50 at step 108. Profitability analysis engine 72 processes the data of step 140 and generates results, in step 142. The results are communicated to application server 68 in step 144; step 144 may include converting data through messaging subsystems 86, 88 (FIG. 3) of interface architecture 74. After profitability processing, process 100 continues with step 110, as shown.

In one embodiment, system 50 provides a downloadable file, such as an Excel spreadsheet, in connection with generating a quote in step 110, so that users may further process and manipulate a particular quote. In another embodiment, system 50 may append notes to quotations generated in step 110; these notes may be downloaded to system 50 as an electronic file (e.g., a Word document) that is generated by an internal user, such as in connection with managing pricing data in step 111.

Figure 5:
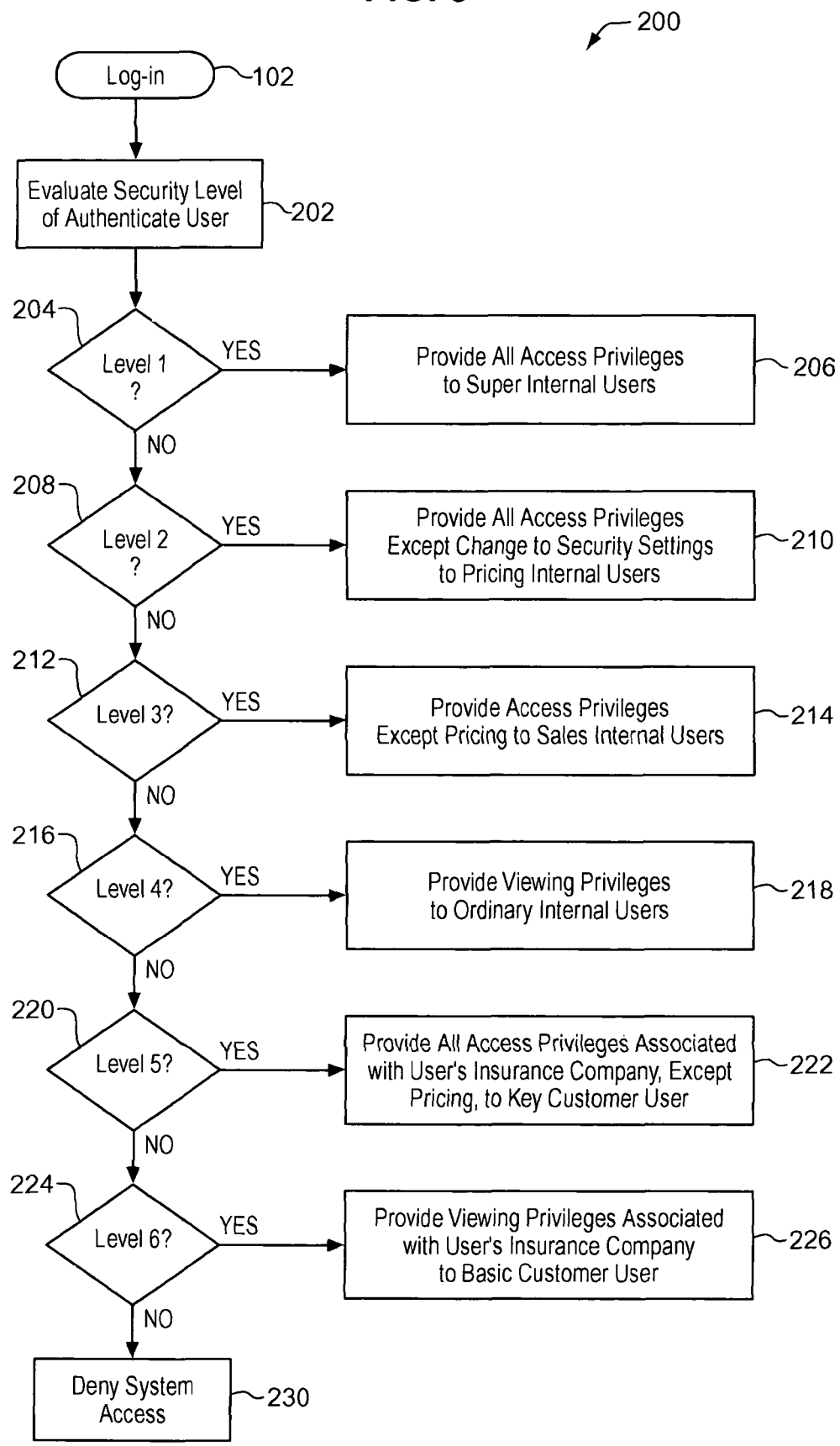
FIG. 5 is a flow chart illustrating one process for managing access to, and control of, the system of FIG. 2.

With further regard to FIG. 4, steps 104, 106 may include a security evaluation process 200 of FIG. 5. In step 202, system 50 evaluates the security level of the user in log-in step 102. If 204 the user is a super internal user, system 50 provides all access privileges to the user as illustrated by step 206. The privileges of 206 may include authorization to modify or change any data used by system 50 to calculate quotes in step 110; by way of example, super internal users can change actuarial tables stored within database 70 and used by application server 68. The super internal user of step 206 may further manage application software and/or pricing data as in step 111, FIG. 4.

If 208 the user is a pricing internal user, system 50 provides all access privileges except, for example, the ability to change security settings of each user, as illustrated by step 210. The pricing internal user of step 210 may further manage application software and/or pricing data as in step 111, FIG. 4.

If 212 the user is a sales internal user, system 50 provides all access privileges except, for example, the ability to change pricing data associated with reinsurance quotations, as illustrated by step 214. The sales internal user of step 214 may further manage application software and/or pricing data as in step 111, FIG. 4.

If 216 the user is an ordinary internal user, system 50 provides viewing privileges associated with reinsurance quotations, as illustrated by step 218. The ordinary internal user of step 218 would not for example typically allow management of application software and/or pricing data as in step 111, FIG. 4.

If 220 the user is a key customer user, system 50 provides all access privileges, except pricing, that are associated with the user's insurance company, as illustrated by step 222. The key customer user of step 222 would not for example allow management of application software and/or pricing data as in step 111, FIG. 4.

If 224 the user is a basic customer user, system 50 provides viewing privileges associated with the user's insurance company, as illustrated by step 226. The basic customer user of step 226 would not for example allow management of application software and/or pricing data as in step 111, FIG. 4.

If a user of process 200 is not authorized to access system 50, access is denied 230, as in step 99, FIG. 4.

Figure 6:
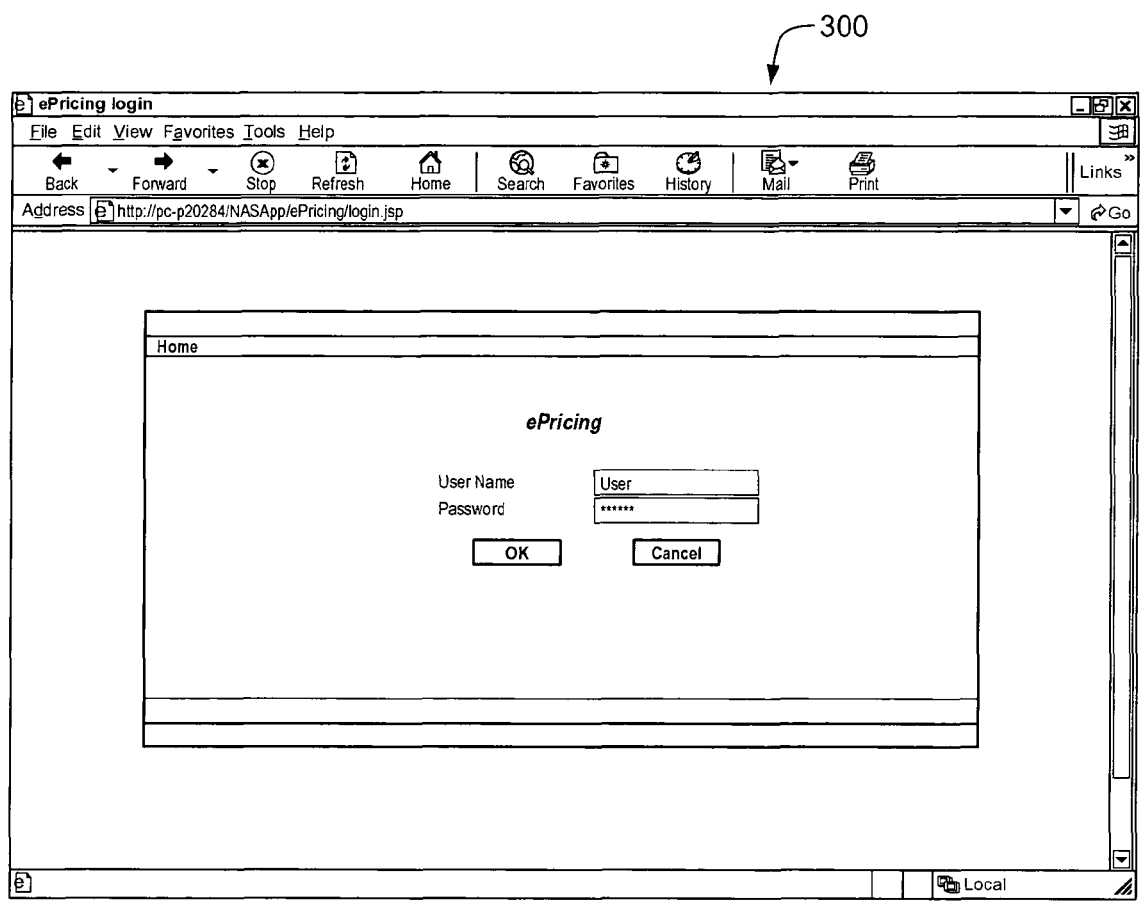
FIG. 6 shows one illustrative quote and profitability HTML link generated by the system of FIG. 2.

FIG. 6 shows one exemplary log-in screen 300 that may facilitate log-in step 102 of FIG. 4. Screen 300 is viewed by a user 52 via a web browser 56; user 52 enters user name and password to screen 300 so that system 50 may authenticate user 52, as in authentication step 104, FIG. 4.

Figure 7:
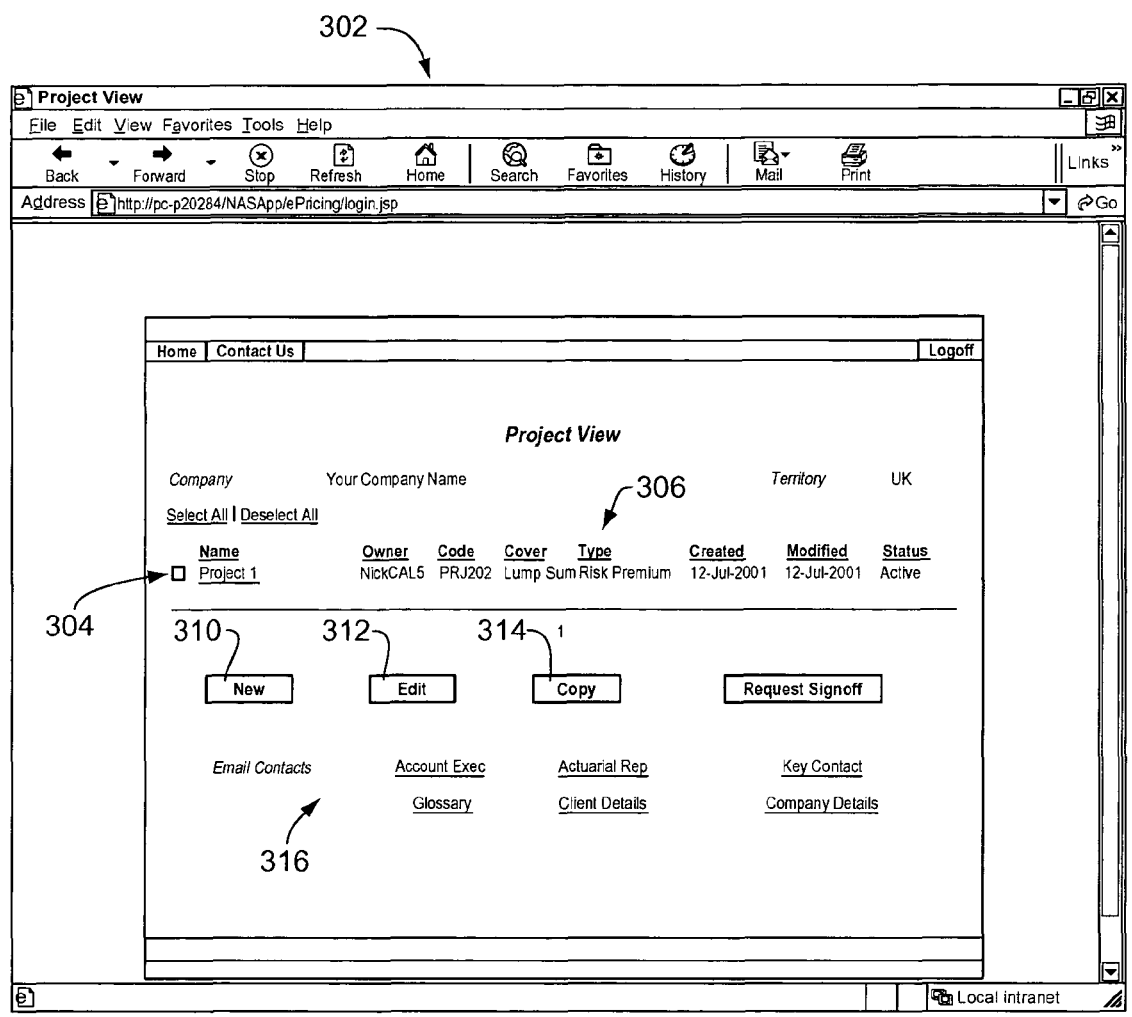
FIG. 7 shows one exemplary project view screen for inputting data to the system of FIG. 2.
Figure 8:
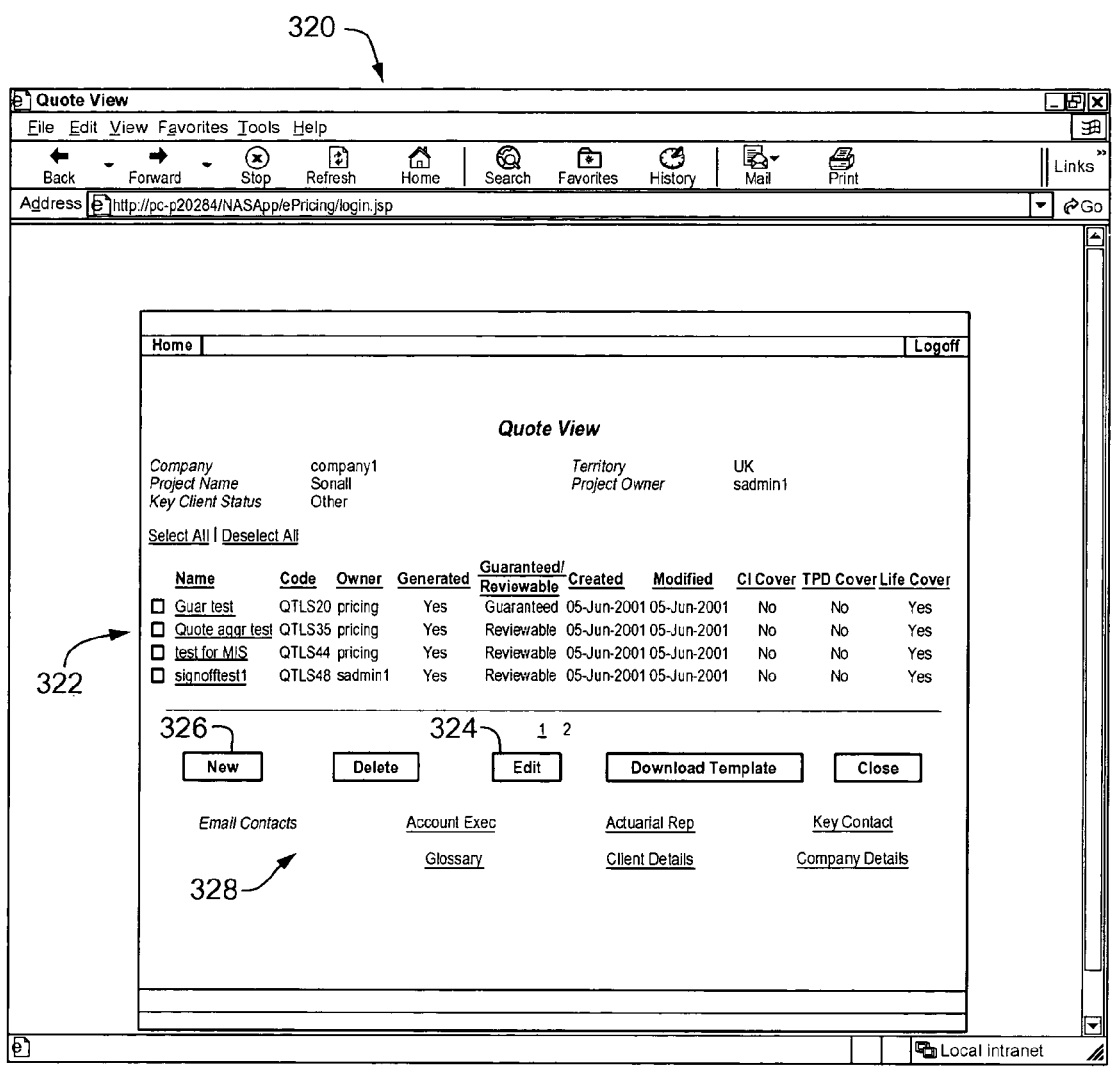
FIG. 8 shows one exemplary quote view screen for inputting data to the system of FIG. 2.

FIG. 7 shows one exemplary project view screen 302 that may facilitate data input step 108 of FIG. 4. Screen 302 may for example display all existing projects 304, name and territory for a particular insurance company. Screen 302 also includes a table 306 of information, such as the project owner, code, cover, type, date created, date modified, and status. By clicking a particular project 304, a quote view screen 320 emerges, such as shown in FIG. 8. Each project represents a specific reinsurance deal associated with a client of the insurance company. A new project may be created by clicking a new project button 310. A project 304 may also be edited and copied by clicking edit and copy buttons 312, 314, respectively. Project view screen 302 also lists email contacts 316 associated with a particular customer; email contacts 316 may for example be used in emailing appropriate users, as in step 114, FIG. 4.

FIG. 8 shows one exemplary quote view screen 320 that may facilitate data input step 108 and/or utilize existing quote step 124 of FIG. 4. Screen 320 may for example display all existing quotes 322 for a particular project. By clicking a particular quote 322, a view results screen emerges, such as shown in FIG. 9 and FIG. 10. Each quote 322 is for example a link to a quotation of reissuance (e.g., stored in database 70, FIG. 2) associated with a client of the insurance company. A quote 322 may also be edited by clicking edit button 324 so as to utilize an existing quote without reentering all data, as in step 124, FIG. 4. A new quote may be created by clicking a new quote button 326; a new quote button 326 generates a quote edit screen 330, FIG. 10, or quote edit screen 340, FIG. 11, depending upon selection of new and edit buttons 324, 326. Quote view screen 320 also lists email contacts 328 associated with a particular project; email contacts 328 may for example be used in emailing appropriate users, as in step 114, FIG. 4.

FIG. 9 shows one exemplary view results screen 330A, which may for example illustrate how a quotation is communicated to a user pursuant to step 112, FIG. 4. The results of screen 330A may be downloaded to the user (e.g., as an Excel file) by clicking download button 332, for example.

FIG. 10 shows one exemplary view results screen 330B, illustrating another example of a quotation communicated to a user pursuant to step 112, FIG. 4

FIG. 11 shows one exemplary quote edit screen 340, which may for example illustrate how a quotation is edited for input or modification pursuant to steps 108, 124, respectively, of FIG. 4. If critical illness cover 342 is selected, a critical illness cover screen 350, FIG. 12, may emerge so user 52 can select appropriate illnesses the insurance policy being quoted. FIG. 13 shows another exemplary quote edit screen 360, which may for example illustrate how a quotation is edited for input or modification pursuant to steps 108, 124, respectively, of FIG. 4.

Figure 14:
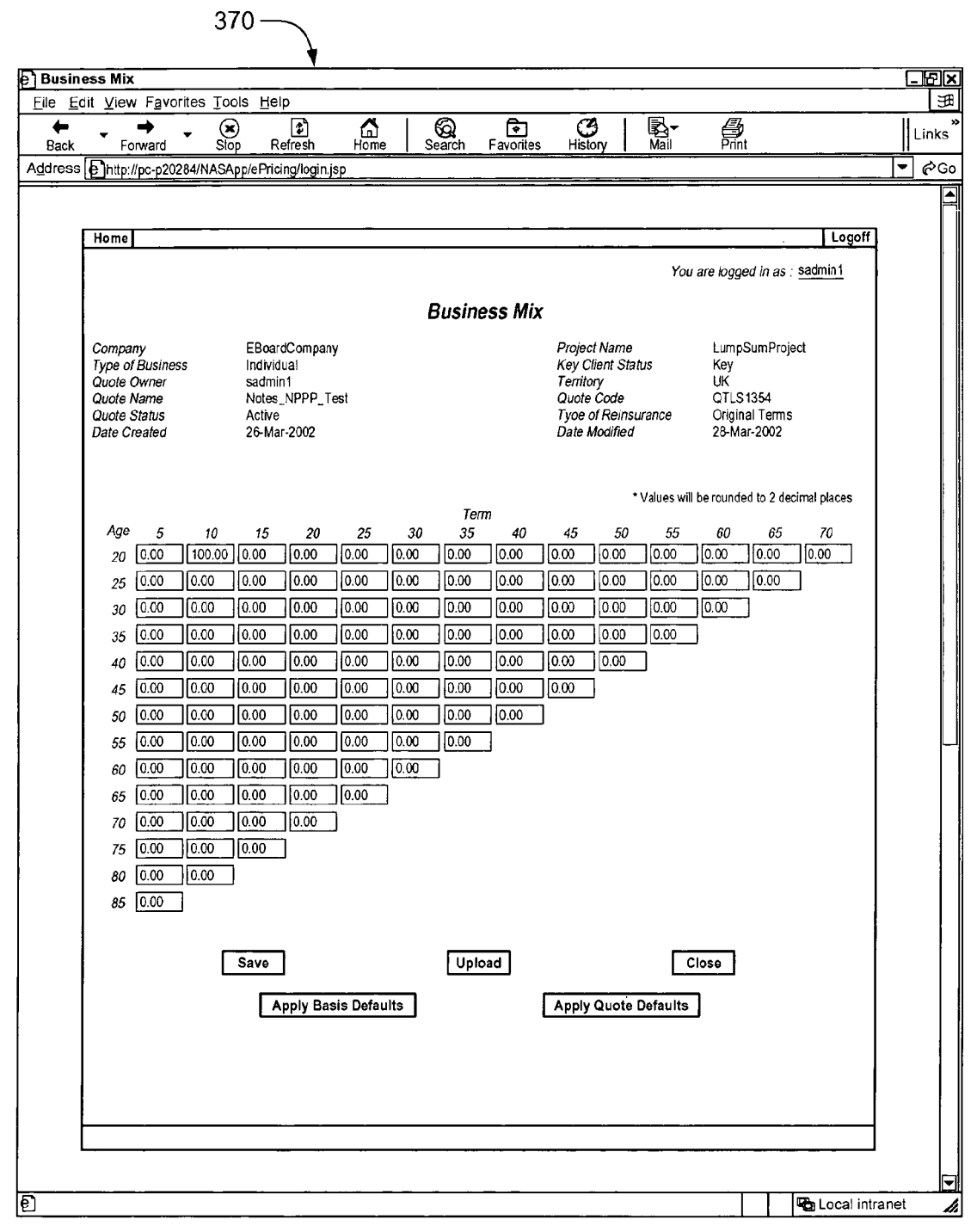

In FIG. 4, step 140 provides for inputting data to system 50 to receive a profitability analysis associated with a reinsurance quotation. FIG. 14 shows one exemplary business mix screen 370 (for Lump Sum) which may be shown to user 52, via browser 56, in connection with step 140. Data input to business mix screen 370 is used by profitability analysis engine 72 to generate results for the associated quote. FIG. 15 shows another exemplary business mix screen 380 (for IPI) which may be shown to user 52, via browser 56, in connection with step 140. Data input to business mix screen 380 is used by profitability analysis engine 72 to provide results for the associated quote.

In FIG. 4, step 110 after step 144 generates these profitability numbers for submission with a particular quotation. FIG. 16 shows one exemplary quote results screen 390 that includes results 392. In one example, profitability software 24 processes data from database 20 to create screen 390. In doing so, software 24 may utilize tables of mortality rates, tax and interest rate tables, and premium rates associated with the insured's age, term and sum insured.

Since certain changes may be made in the above methods and systems without departing from the scope hereof, it is intended that all matter contained in the above description or shown in the accompanying drawing be interpreted as illustrative and not in a limiting sense. It is also to be understood that the following claims are to cover all generic and specific features described herein, and all statements of the scope of the invention which, as a matter of language, might be said to fall there between.

What is claimed is:

1. A method for quoting reinsurance for a reinsurance company, comprising the steps of:

authorizing electronic requests from one or more customer users, the one or more customer users including users associated with insurance companies seeking a plurality of quotes from the reinsurance company for reinsuring insurance policies underwritten by the insurance companies;

receiving data at an application server from a first customer user of the one or more customer users for the plurality of quotes of reinsurance, wherein the data provided includes data relating to at least one specific insurance policy issued by a first insurance company;

automatically retrieving, for processing at a profitability engine, at least a portion of the data received from the first customer user and relating to the at least one specific insurance policy;

generating a profitability analysis for each of the reinsurance policies quoted using the retrieved data and at least one of a mortality rate, a tax and interest rate, and a premium rate associated with the at least one specific insurance policy, wherein the profitability analysis indicates for each of the reinsurance policies quoted whether the quoted reinsurance policy improves profitability of the first insurance company by transferring risks defined by the first customer user and associated with the at least one specific insurance policy to the reinsurance company for an amount associated with the quote;

processing the data according to rules within a database networked with the application server to generate the plurality of quotes of reinsurance for the at least one specific insurance policy;

electronically communicating each of the reinsurance policies quoted to the first customer user including each corresponding profitability analysis; and enabling the first customer user to select one of the reinsurance policies quoted for improving profitability of the first insurance company including electronically transmitting a reinsurance contract to the first customer user, the reinsurance contract corresponding to the selected quote.

2. The method of claim 1, the step of authorizing comprising the step of qualifying the one or more customer users to a plurality of security levels providing differing levels of access to, and control of, the database.

3. The method of claim 1, the step of receiving data comprising the step of receiving data through a web browser interface from a computer networked with the application server.

4. The method of claim 1, the step of receiving data comprising receiving a selection of an existing quote stored within the database through a web browser at a computer networked with the application server.

5. The method of claim 1, further comprising generating email to one or more internal users indicating generation of the quote, wherein the one or more internal users include users associated with the reinsurance company.

6. The method of claim 5, the step of generating email comprising determining the internal users through an association stored in the database and linking the internal users to the one or more customer users.

7. The method of claim 6, the step of generating email comprising generating batch email at an end of a day.

8. The method of claim 1, the step of electronically communicating comprising generating email to the one or more customer users.

9. The method of claim 8, the step of generating email comprising sending one of text defining the quote or a hyperlink to the quote stored on the database.

10. The method of claim 1, further comprising the steps of accepting inputs from the first customer user indicating acceptance of the quote and immediately generating email to one or more internal users indicating that the first customer user desires to execute an reinsurance contract based upon the quote.

11. The method of claim 1, further comprising setting a time delay between processing the data to generate the quote and electronically communicating the quote to the user.

12. The method of claim 1, the step of electronically communicating comprising downloading a spreadsheet to a computer associated with the first customer user.

13. The method of claim 1, further comprising the step of appending text to the quote by downloading the text to the database prior to the step of processing the data.

14. The method of claim 1, further comprising the step of analyzing profitability of the data provided to the application server, the step of electronically communicating comprising the step of communicating profitability of the quote to the first customer user.

15. The method of claim 14, further comprising the step of communicating messages between the application server and a profitability engine to facilitate communications between the application server and profitability software of the profitability engine.

16. A system for quoting reinsurance for a reinsurance company, said system comprising:

a web server for receiving electronic requests for reinsurance quotations and for authenticating users generating the requests;

an application server connected with the web server for formulating the quotation based upon the requests;

a profitability engine for analyzing profitability of the quotation; and a database connected with the application server for storing the quotation and other data used in generating the quotation, wherein said system is further configured to:

receive electronic requests for a plurality of reinsurance quotations from customer users, the customer users including users associated with insurance companies seeking a plurality of quotes from the reinsurance company for reinsuring insurance policies underwritten by the insurance companies;

receive data from a first customer user of the customer users for the plurality of quotes of reinsurance, wherein the data provided includes data relating to at least one specific insurance policy issued by a first insurance company;

retrieve data, for processing at the profitability engine, at least a portion of the data received from the first customer user and relating to the at least one specific insurance policy;

generate a profitability analysis at the profitability engine for each of the reinsurance policies quoted using the retrieved data and at least one of a mortality rate, a tax and interest rate, and a premium rate associated with the at least one specific insurance policy, wherein the profitability analysis indicates for each of the reinsurance policies quoted whether the quoted reinsurance policy improves profitability of the first insurance company by transferring risks defined by the first customer user and associated with the at least one specific insurance policy to the reinsurance company for an amount associated with the quote;

process the received data according to rules within the database to generate the plurality of quotes of reinsurance for the at least one specific insurance policy;

electronically communicate each of the reinsurance policies quoted to the first customer user including each corresponding profitability analysis; and prompt the first customer user to select one of the reinsurance policies quoted for improving profitability of the first insurance company including electronically transmitting a reinsurance contract to the first customer user, the reinsurance contract corresponding to the selected quote.

17. The system of claim 16, the electronic requests comprising a selection to a preexisting quote within the database.

18. The system of claim 16, the application server having means for inserting, deleting and updating records within the database.

19. The system of claim 16, the web server comprising a plug in for comparing authorization data associated with the electronic requests with data stored in a policy server and database.

20. The system of claim 16, further comprising an interface architecture for communicating between the application server and the profitability engine, through a pair of messaging subsystems.

21. The system of claim 16, further comprising means for generating email to the users, the email comprising the reinsurance quotation.

22. The system of claim 16, further comprising means for generating email to one or more internal users in response to generation of a reinsurance quotation.

23. A software product comprising instructions, stored on computer-readable media, wherein the instructions, when executed by a computer, perform steps for quoting reinsurance for a reinsurance company, comprising the steps of:

authorizing electronic requests from one or more customer users, the one or more customer users including users associated with insurance companies seeking a plurality of quotes from the reinsurance company for reinsuring insurance policies underwritten by the insurance companies;

receiving data at an application server from a first customer user of the one or more customer users for the plurality of quotes of reinsurance, wherein the data provided includes data relating to at least one specific insurance policy issued by a first insurance company;

retrieving data, for processing at a profitability engine, at least a portion of the data received from the first customer user and relating to the at least one specific insurance policy;

generating a profitability analysis for each of the reinsurance policies quoted using the retrieved data and at least one of a mortality rate, a tax and interest rate, and a premium rate associated with the at least one specific insurance policy, wherein the profitability analysis indicates for each of the reinsurance policies quoted whether the quoted reinsurance policy improves profitability of the first insurance company by transferring risks defined by the first customer user and associated with the at least one specific insurance policy to the reinsurance company for an amount associated with the quote;

processing the data according to rules within a database to generate the plurality of quotes of reinsurance for the at least one specific insurance policy;

electronically communicating each of the reinsurance policies quoted to the first customer user including each corresponding profitability analysis; and prompting the first customer user to select one of the reinsurance policies quoted for improving profitability of the first insurance company including electronically transmitting a reinsurance contract to the first customer user, the reinsurance contract corresponding to the selected quote.

24. The software product of claim 23, the step of authorizing comprising the step of qualifying the one or more customer users to a plurality of security levels providing differing levels of access to, and control of, the database.

25. The software product of claim 23, the step of receiving data comprising receiving a selection of an existing quote stored within the database through a web browser at a computer networked with the application server.

26. The software product of claim 23, further comprising generating email to one or more internal users indicating generation of the quote.

27. The software product of claim 26, the step of generating email comprising determining the internal users through an association stored in the database and linking the internal users to the one or more customer users.

28. The software product of claim 27, the step of generating email comprising generating batch email at an end of a day.

29. The software product of claim 23, the step of electronically communicating comprising generating email to at least one of the one or more customer users.

30. The software product of claim 29, the step of generating email comprising sending one of text defining the quote or a hyperlink to the quote stored on the database.

31. The software product of claim 23, further comprising the steps of accepting inputs from the first customer user indicating acceptance of the quote and immediately generating email to one or more internal users indicating that the first customer user desires to execute an reinsurance contract based upon the quote.

32. The software product of claim 23, further comprising delaying communication of the quote by a preset time period.

33. The software product of claim 23, the step of electronically communicating comprising downloading a spreadsheet to a computer associated with the first customer user.

34. The software product of claim 23, further comprising the step of appending text to the quote by downloading the text to the database prior to the step of processing the data.

35. The software product of claim 23, further comprising the step of analyzing profitability of the data provided to the application server, the step of electronically communicating comprising the step of communicating profitability of the quote to the first customer user.

36. The software product of claim 35, further comprising the step of communicating messages between the application server and the profitability engine to facilitate communications between the application server and profitability software of the profitability engine.

\* \* \* \* \*